United States Patent [19]
Nishigata

[11] Patent Number: 5,769,983
[45] Date of Patent: Jun. 23, 1998

[54] PNEUMATIC RADIAL TIRES PROVIDED WITH A SIDE PORTION REINFORCING LAYER

[75] Inventor: Hiroshi Nishigata, Tokyo, Japan

[73] Assignee: Bridgestone Corporation, Tokyo, Japan

[21] Appl. No.: 862,368

[22] Filed: May 23, 1997

[30] Foreign Application Priority Data

May 29, 1996 [JP] Japan .................................... 8-135039

[51] Int. Cl.[6] .............................. B60C 9/00; B60C 9/08; B60C 17/00; B60C 17/06
[52] U.S. Cl. .......................................... 152/555; 152/517
[58] Field of Search .................................... 152/517, 555, 152/549

[56] References Cited

U.S. PATENT DOCUMENTS

| | | |
|---|---|---|
| 4,365,659 | 12/1982 | Yoshida et al. . |
| 5,368,082 | 11/1994 | Oare et al. . |
| 5,529,105 | 6/1996 | Hayashi et al. . |

FOREIGN PATENT DOCUMENTS

| | | |
|---|---|---|
| 0 456 437 A2 | 11/1991 | European Pat. Off. . |
| 0 605 177 A1 | 7/1994 | European Pat. Off. . |
| 2 271 947 | 12/1975 | France . |
| 2 344 413 | 10/1977 | France . |
| 52-31404 | 3/1977 | Japan .................................... 152/517 |
| 55-34001 | 9/1980 | Japan .................................... 152/517 |
| 2 053 815 | 5/1980 | United Kingdom . |

OTHER PUBLICATIONS

European Search Report, dated Sep. 15, 1997.

*Primary Examiner*—Adrienne C. Johnstone
*Attorney, Agent, or Firm*—Sughrue, Mion, Zinn, Macpeak & Seas, PLLC

[57] ABSTRACT

A pneumatic radial tire or run flat tire comprises a pair of bead cores, a radial carcass of a rubberized cord ply, a belt comprised of rubberized belt layers, a tread disposed outside the belt in the radial direction, and a side portion reinforcing layer extending along an inner surface of the carcass over a full region of each side portion and having a crescent shape at a radial section thereof, in which when a periphery length of the side portion reinforcing layer is divided into three equal parts along an inner surface of the tire, a thickness of the side portion reinforcing layer at a section in a radial direction of the tire is thickest in the vicinity of the 1/3 point located outward in the radial direction.

3 Claims, 1 Drawing Sheet

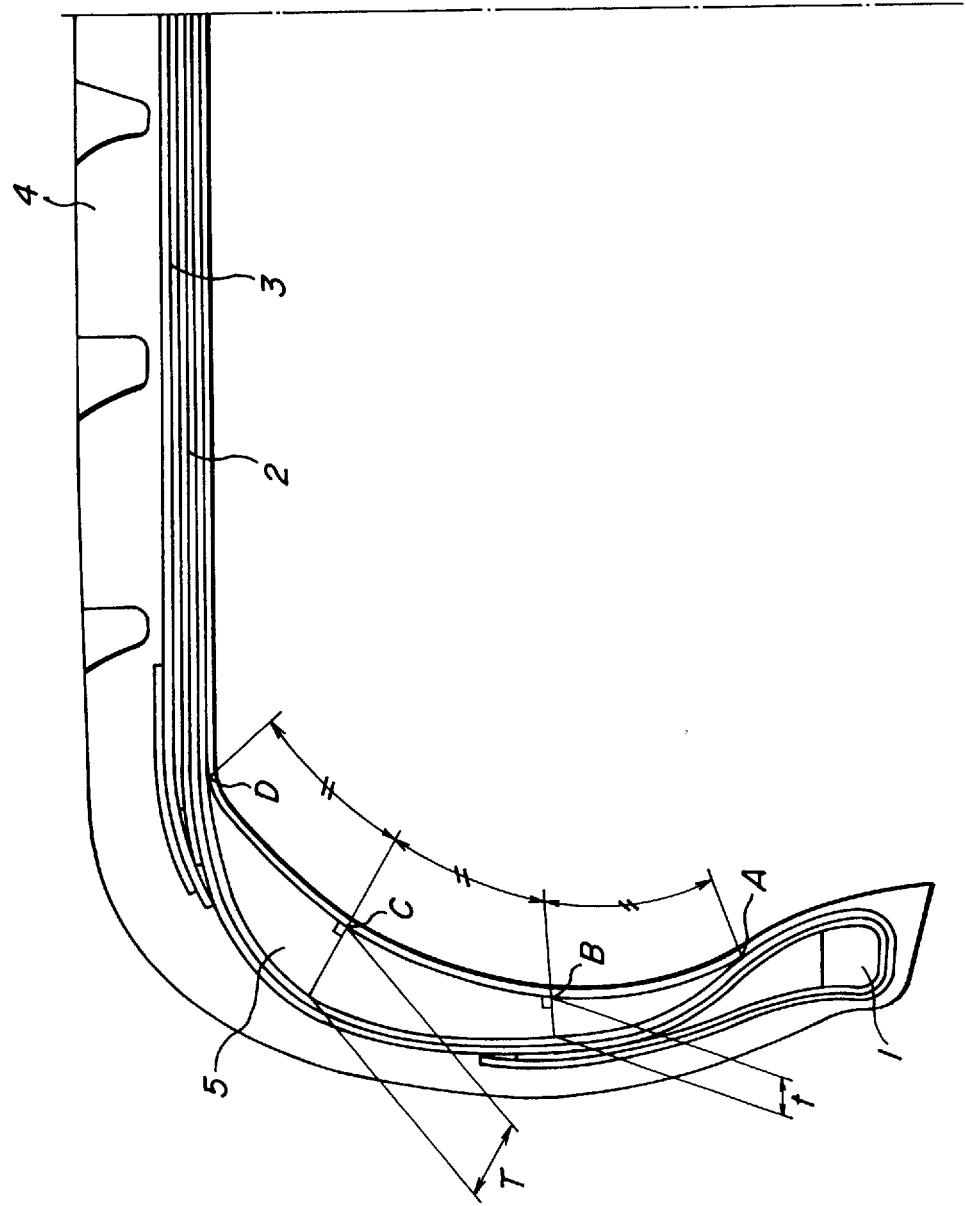

PNEUMATIC RADIAL TIRES PROVIDED WITH A SIDE PORTION REINFORCING LAYER

BACKGROUND OF THE INVENTION

1. Field of the Invention

This invention relates to a pneumatic radial tire, and more particularly to a pneumatic radial tire comprising a pair of bead portions each embedding a bead core therein, a radial carcass of a rubberized cord ply extending between both bead portions through a crown portion and a pair of side portions and wound around each of the bead cores from inside toward outside, a belt superimposed outward on a crown portion of the carcass in a radial direction and comprised of rubberized belt layers containing substantially non-extensible cords therein, a tread disposed outside the belt in the radial direction, and a side portion reinforcing layer extending along an inner surface of the carcass over a full region of the side portion and having a crescent shape at a radial section thereof, or so-called run-flat tire capable of continuously running even if an internal pressure of the tire is lowered by puncture or the like.

2. Description of Related Art

The conventional run flat tire is provided with a side portion reinforcing layer extending along an inner surface of a carcass ply over a full region of each of both side portions and having a crescent shape at a radial section so as to have an approximately uniform thickness of the side portion as a whole, whereby a uniform rigidity is applied to the whole of the side portion and hence it is possible to continuously run the tire by bearing a load through the rigidity of the reinforced side portion even if the internal pressure of the tire is lowered by puncture or the like.

In such a run flat tire provided with the side portion reinforcing layer, it is most important how far the tire can continuously be run after the lowering of the internal pressure by puncture or the like, or the running durability of the tire after the puncture is a most important requirement.

In order to improve the running durability after the puncture, it is effective to increase elastomer constituting the side portion reinforcing layer to increase the thickness of the side portion reinforcing layer. In this case, however, there are caused inconveniences such as the increase of tire weight and deterioration of steering stability and ride comfortability.

Recently, it is strongly demanded to reduce the tire weight from a viewpoint of resource-saving and energy-saving. For this purpose, it is attempted to decrease the number of the carcass cord plies from two plies to one ply. In this case, however, the side rigidity of the tire is lacking and hence the running durability after the puncture is undesirably degraded.

SUMMARY OF THE INVENTION

It is, therefore, an object of the invention to solve the aforementioned problems of the conventional technique and to provide a pneumatic radial tire or run flat tire provided with a side portion reinforcing layer having an excellent running durability after puncture without increasing tire weight and degrading basic performances required for the tire such as steering stability, ride comfortability and the like.

According to the invention, there is the provision of a pneumatic radial tire comprising a pair of bead portions each with a bead core embedded therein, a radial carcass of a rubberized cord ply extending between both bead portions through a crown portion and a pair of side portions and wound around each of the bead cores from inside toward outside, a belt superimposed outward on a crown portion of the carcass in a radial direction and comprised of rubberized belt layers containing substantially non-extensible cords therein, a tread disposed outside the belt in the radial direction, and a side portion reinforcing layer extending along an inner surface of the carcass over a full region of each side portion and having a crescent shape at a radial section thereof, in which when a periphery length of the side portion reinforcing layer is divided into three equal parts along an inner surface of the tire, a thickness of the side portion reinforcing layer at a section in a radial direction of the tire is thickest in the vicinity of the 1/3 point located outward in the radial direction.

In a preferable embodiment of the invention, the thickness of the side portion reinforcing layer in the radial section at the 1/3 point located outward in the radial direction is 1.8–2.8 times the thickness of the side portion reinforcing layer in the radial section at the 1/3 point located inward in the radial direction.

In another preferable embodiment of the invention, the side portion reinforcing layer is made from rubber having a hardness of 75–95 degree. Throughout the specification, the rubber hardness means a value of an International Rubber Hardness measured by hardness testing methods for vulcanized rubber according to JIS K6253-1993.

BRIEF DESCRIPTION OF THE DRAWING

The invention will be described with reference to the accompanying drawing, wherein:

FIG. 1 is a diagrammatically left-half radial section view of a pneumatic radial tire according to the invention.

DESCRIPTION OF PREFERRED EMBODIMENTS

As previously mentioned, in the conventional run flat tire provided with the side portion reinforcing layer, it was possible to continuously run the tire even if the internal pressure of the tire was lowered by puncture or the like because the load applied to the tire was born by the rigidity of the side portion reinforced with the side portion reinforcing layer extending along the inner surface of the carcass ply over the full region of each of the side portions and having the crescent shape at the radial section so as to have approximately a uniform thickness of the side portion as a whole.

However, when the deformation behavior of such a tire is minutely investigated during the running at a punctured state, it has been found that the degree of the bending deformation in the side portion of the tire is not uniform as a whole of the side portion and becomes large at a position near to the tread and troubles during the running after the puncture concentrate in the vicinity of 1/3 point located outward in the radial direction when the periphery length of the side portion reinforcing layer is divided into three equal parts along the inner surface of the tire.

In the pneumatic radial tire provided with the side portion reinforcing layer according to the invention, when the periphery length of the side portion reinforcing layer is divided into three equal parts along the inner surface of the tire, the thickness of the side portion reinforcing layer at the radial section is thickest in the vicinity of 1/3 point located outward in the radial direction. Preferably, the thickness of the side portion reinforcing layer at the radial section in 1/3 point located outward in the radial direction is 1.8–2.8 times the thickness of the side portion reinforcing layer at the radial section in 1/3 point located inward in the radial direction. Thus, troubles hardly occur even when the tire is continuously run after the lowering of the internal pressure by puncture or the like and hence there is obtained a run flat tire having an improved running durability after the puncture.

In the pneumatic radial tire according to the invention, the side portion reinforcing layer is preferably made from rubber having a hardness of 75–95 degree. When the hardness of rubber forming the side portion reinforcing layer is less than 75 degree, the rigidity of the side portion reinforcing layer is lacking and the longitudinal deflection becomes large and hence when the tire is continuously run after the lowering of the internal pressure by puncture or the like, a large strain is created in the side portion reinforcing layer to degrade the running durability after the puncture. While, when it exceeds 95 degree, the rigidity of the side portion reinforcing layer is too large and hence the ride comfortability is considerably degraded in usual use at a state of running under a given internal pressure.

An embodiment of the pneumatic radial tire provided with the side portion reinforcing layer according to the invention will be described with reference to the accompanying drawing together with a comparative example of the run flat tire provided with the side portion reinforcing layer. These tires have a tire size of 275/40R17.

A pneumatic radial tire or run flat tire shown in FIG. 1 as Example 1 of the invention comprises a pair of bead portions each embedding a bead core 1 therein, a radial carcass 2 of two rubberized cord plies extending between both bead portions through a crown portion and a pair of side portions and wound around each of the bead cores 1 from inside toward outside, a belt 3 superimposed outward on a crown portion of the carcass 2 in a radial direction and comprised of rubberized belt layers containing substantially non-extensible cords therein, and a tread 4 disposed outside the belt 3 in the radial direction. Further, a side portion reinforcing layer 5 is extended along an inner surface of the carcass 2 over a full region of the side portion and has a crescent shape at a radial section thereof. When the periphery length of the side portion reinforcing layer 5 is divided into three equal parts along the inner surface of the tire, the thickness of the side portion reinforcing layer 5 at the radial section is thickest in the vicinity of 1/3 point (C) located outward in the radial direction.

The thickness (T) of the side portion reinforcing layer 5 at the radial section in 1/3 point (C) located outward in the radial direction is 2.0 times the thickness (t) of the side portion reinforcing layer 5 at the radial section in 1/3 point (B) located inward in the radial direction.

The side portion reinforcing layer 5 is made from rubber having a hardness of 84 degree.

A run flat tire of Example 2 is substantially the same as the run flat tire of Example 1 except that when the periphery length of the side portion reinforcing layer 5 is divided into three equal parts along the inner surface of the tire, the thickness (T) of the side portion reinforcing layer 5 at the radial section in 1/3 point (C) located outward in the radial direction is 2.5 times the thickness (t) of the side portion reinforcing layer 5 at the radial section in 1/3 point (B) located inward in the radial direction.

A run flat tire of Comparative Example 1 is substantially the same as the run flat tire of Example 1 except that when the periphery length of the side portion reinforcing layer 5 is divided into three equal parts along the inner surface of the tire, the thickness (T) of the side portion reinforcing layer 5 at the radial section in 1/3 point (C) located outward in the radial direction is 1.5 times the thickness (t) of the side portion reinforcing layer 5 at the radial section in 1/3 point (B) located inward in the radial direction.

A run flat tire of Comparative Example 2 is substantially the same as the run flat tire of Example 1 except that when the periphery length of the side portion reinforcing layer 5 is divided into three equal parts along the inner surface of the tire, the thickness (T) of the side portion reinforcing layer 5 at the radial section in 1/3 point (C) located outward in the radial direction is 3.0 times the thickness (t) of the side portion reinforcing layer 5 at the radial section in 1/3 point (B) located inward in the radial direction.

A test for measuring a continuous running distance after the lowering of the internal pressure by the puncture or evaluating the running durability after the puncture is made with respect to the run flat tires of Examples 1 and 2 and Comparative Examples 1 and 2.

Assuming that the internal pressure is rendered into zero by the puncture of the tire, the running distance until the occurrence of troubles at a state of opening a valve is measured. When the running distance is represented by an index on the basis that the tire of Comparative Example 1 is 100, the index value of the running distance is 98 in the tire of Comparative Example 2, 120 in the tire of Example 1 and 125 in the tire of Example 2, respectively. The larger the index value, the better the running durability after the puncture.

As seen from the above results, the pneumatic radial tires according to the invention are superior to the comparative pneumatic radial tire in the running durability after the puncture.

What is claimed is:

1. A pneumatic radial tire comprising a pair of bead portions each with a bead core embedded therein, a radial carcass of a rubberized cord ply extending between both bead portions through a crown portion and a pair of side portions and wound around each of the bead cores from inside toward outside, a belt superimposed outward on a crown portion of the carcass in a radial direction and comprised of rubberized belt layers containing substantially non-extensible cords therein, a tread disposed outside the belt in the radial direction, and a side portion reinforcing layer extending along an inner surface of the carcass over a full region of each side portion and having a crescent shape at a radial section thereof, in which when a periphery length of the side portion reinforcing layer is divided into three equal parts along an inner surface of the tire, a thickness of the side portion reinforcing layer at a section in a radial direction of the tire is thickest in the vicinity of the 1/3 point located outward in the radial direction.

2. A pneumatic radial tire according to claim 1, wherein the thickness of the side portion reinforcing layer in the radial section at the 1/3 point located outward in the radial direction is 1.8–2.8 times the thickness of the side portion reinforcing layer in the radial section at the 1/3 point located inward in the radial direction.

3. A pneumatic radial tire according to claim 1, wherein the side portion reinforcing layer is made from rubber having a hardness of 75–95 degree.

* * * * *